US008573860B2

(12) United States Patent
Teo

(10) Patent No.: US 8,573,860 B2
(45) Date of Patent: Nov. 5, 2013

(54) PLUGGABLE OPTICAL NETWORK UNIT TRANSCEIVER

(71) Applicant: Finisar Corporation, Sunnyvale, CA (US)

(72) Inventor: Tat Ming Teo, Singapore (SG)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 13/652,381

(22) Filed: Oct. 15, 2012

(65) Prior Publication Data

US 2013/0044985 A1 Feb. 21, 2013

Related U.S. Application Data

(62) Division of application No. 12/618,504, filed on Nov. 13, 2009, now Pat. No. 8,287,192.

(30) Foreign Application Priority Data

Nov. 13, 2008 (SG) .............................. 200808465-9

(51) Int. Cl.
G02B 6/36 (2006.01)
H04B 10/00 (2013.01)
H01L 31/0203 (2006.01)

(52) U.S. Cl.
USPC ............................................... 385/88; 385/92

(58) Field of Classification Search
USPC ............................................. 385/88–95, 147
See application file for complete search history.

(56) References Cited

U.S. PATENT DOCUMENTS

| 5,353,194 | A  | * | 10/1994 | Libretti et al. ................. 361/707 |
| 6,856,769 | B1 | * | 2/2005  | Steffensen et al. ........... 398/135 |
| 6,980,074 | B1 | * | 12/2005 | Jitaru ............................. 336/200 |
| 7,651,341 | B2 | * | 1/2010  | Wu ............................... 439/76.1 |
| 8,160,451 | B2 | * | 4/2012  | Liu et al. ....................... 398/138 |

* cited by examiner

Primary Examiner — Akm Enayet Ullah
(74) Attorney, Agent, or Firm — Maschoff Brennan

(57) ABSTRACT

In one example embodiment, a pluggable ONU transceiver module comprises a top shell, a bottom shell configured to mate with the top shell to form a cavity, and a PCB disposed within the cavity. A plurality of pins are coupled to the PCB and are configured to be inserted into a protruding socket of a host device through the bottom shell. The protruding socket is mounted on a PCB of the host device. The pluggable ONU transceiver module further comprises one or more guiding features integrated with the bottom shell and configured to ensure that the pins are inserted correctly into the protruding socket, and means for positioning the top shell at a predetermined height above the PCB of the host device to allow coupling of the top shell to a heatsink of the host device.

20 Claims, 10 Drawing Sheets

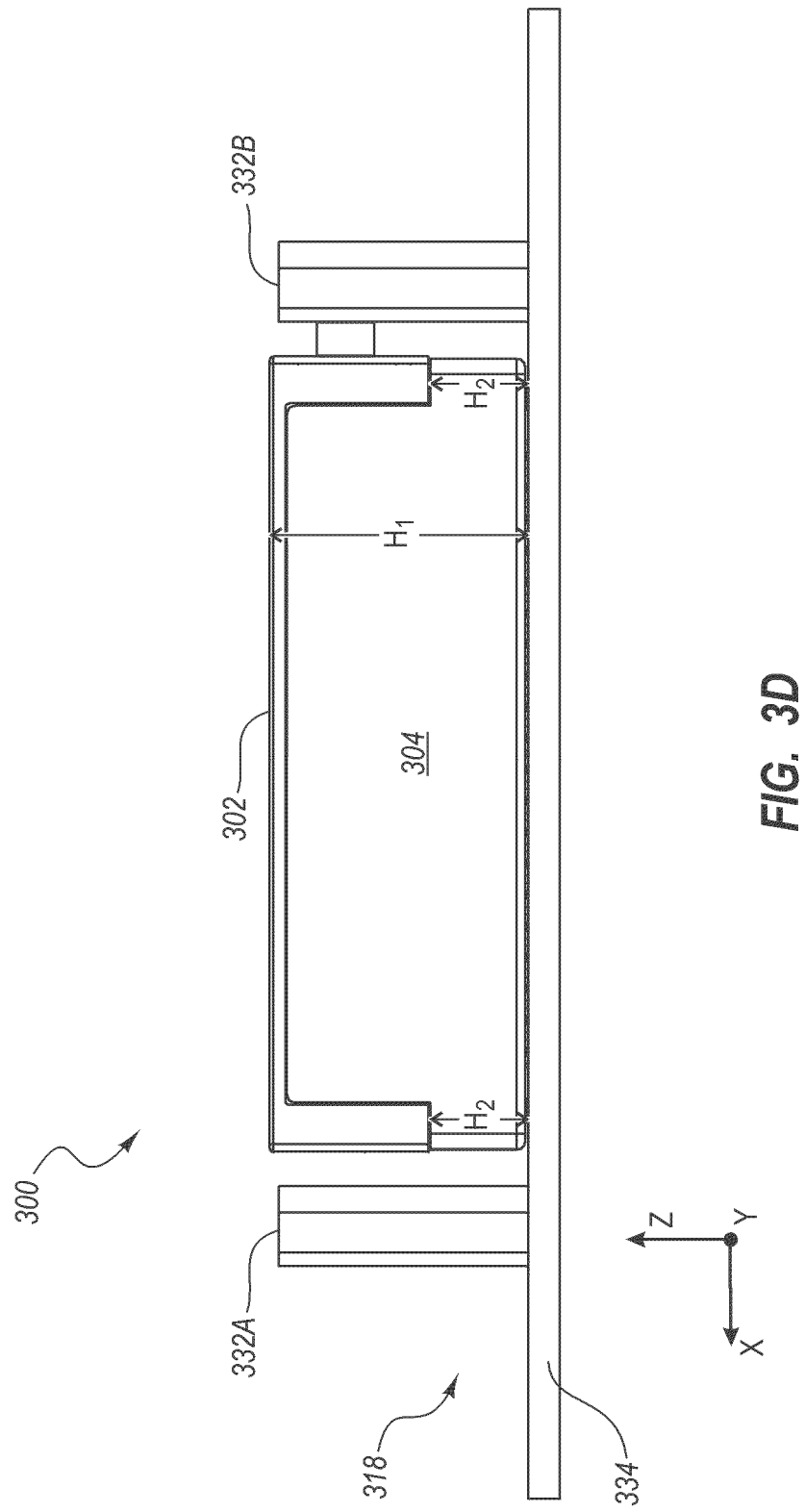

PLUGGABLE OPTICAL NETWORK UNIT TRANSCEIVER

CROSS-REFERENCE TO RELATED APPLICATIONS

This application is a Divisional of U.S. patent application Ser. No. 12/618,504, filed Nov. 13, 2009, titled OPTICAL NETWORK UNIT TRANSCEIVER, which in turn claims the benefit of Singapore Patent Application No. 200808465-9, filed on Nov. 13, 2008, both of which are incorporated herein by reference in their entireties.

BACKGROUND OF THE INVENTION

1. Field of the Invention

Embodiments of the present invention generally relate to communication systems. In particular, example embodiments relate to an optical network unit (ONU) transceiver module configured to provide a number of features such as ensuring I/O pin alignment, preventing tilting, and/or positioning the top of the ONU transceiver module at a predetermined height above a host printed circuit board (PCB) having a protruding socket.

2. Related Technology

Interest in broadband optical access networks is growing, driven by an increasing demand for high-speed multimedia services. Optical access networks are often referred to as fiber-to-the-curb (FTTC), fiber-to-the-building (FTTB), fiber-to-the-premise (FTTP), or fiber-to-the-home (FTTH). Each such network provides an access from a central office to a building, or a home, via optical fibers in an optical cable. As the transmission quantity of such an optical cable is much greater than the bandwidth actually required by each subscriber, passive optical networks (PON) shared between many subscribers through splitters have been developed.

Referring to FIGS. 1A and 1B, a conventional ONU transceiver module 100 and host device 102 are shown. The ONU transceiver module 100 includes input/output (I/O) pins 104 that are plugged into the host device's 102 internal PCB 106. The ONU transceiver module includes an RF connector 108 for an RF cable to connect to the ONU transceiver module 100. More specifically, typical ONU transceiver modules 100 have 20 I/O pins in a row protruding from the bottom of the ONU transceiver modules 100 and the standard RF connector 108 for transmission of an electrical video signal. One example of a standard RF connector used is a SubMiniature B (SMB) connector that protrudes from a side of the ONU transceiver module 100.

The host device 102 includes a protruding connector 110 configured to receive the I/O pins 104 of the ONU transceiver module 100. Because the protruding connector 110 extends above the PCB 106, the module 100 has to be raised to a height which is at the same level as the protruding connector 110 to prevent tilting when the module 100 is plugged into the host device 102. Additionally, proper functioning requires that the I/O pins 104 are plugged into the correct holes of the protruding socket 110.

The conventional module 100 of FIG. 1A includes various features to address these two problems, including a plurality of stepped guide pins 112A-112C and a stabilizing rib 114. Each of the stepped guide pins 112A-112C includes a guiding pin 116A-116C and a stepped portion 118A-118C. The stepped portions 118A-118C and stabilizing rib 114 are configured to rest on the host device 102 PCB 106 to raise the module 100 to the same level as the protruding connector 110 to prevent tilting when the module 100 is plugged into the host device 102. The guiding pins 116A-116C are configured to be received by guiding holes 120A-120C on the host PCB 106; alignment of the guiding pins 116A-116C with the guiding holes 120A-120C aligns the I/O pins 104 with the corresponding holes of the protruding I/O socket 110. After aligning the guiding pins 116A-116C with the guiding holes 120A-120C, the guiding pins 116A-116C can be received in the guiding holes 120A-120C, allowing the I/O pins 104 to then be inserted into the correct holes of the protruding I/O socket 110.

Each of the stepped guide pins 112A-112C is a separate component that increases the number of separate parts used in assembling the module 100. Generally speaking, each additional part used in module 100 assembly not only increases the cost of the module 100, but also increases the processes required to assemble the finished product. Moreover, in the conventional module 100 of FIG. 1A, holes are formed in the module 100 to receive each of the stepped guiding pins 112A-112C—these holes can weaken the shell structure of the module 100. Furthermore, the guiding pins 116A-116C are relatively long compared to their diameter such that the guiding pins 116A-116C may be susceptible to breaking or bending.

The host device 102 further includes a plurality of posts 122A and 122B configured to be coupled to a heatsink (not shown) to dissipate heat away from the module 100. For the heatsink to operate effectively, the module 100 must be positioned at a predetermined height above the PCB 106 when the module 100 is plugged into the host device 102. Module designs that do not meet the height requirement have to be raised or lowered to ensure proper contact with the heatsink.

SUMMARY

In general, example embodiments of the invention relate to ONU transceiver modules configured to address various problems in prior art implementations. For example, disclosed embodiments provide one or more advantages, such as ensuring I/O pin alignment with protruding sockets of host devices, the ability to be positioned at predetermined heights above the host devices, and/or preventing tilting of the ONU transceiver modules when plugged into the host devices.

In one example embodiment, a pluggable ONU transceiver module comprises a top shell, a bottom shell configured to mate with the top shell to form a cavity, and a PCB disposed within the cavity. A plurality of I/O pins are coupled to the PCB and are configured to be inserted into a protruding socket of a host device through the bottom shell. The protruding socket is mounted on a PCB of the host device. The pluggable ONU transceiver module further comprises one or more guiding features integrated with the bottom shell and configured to ensure that the I/O pins are inserted correctly into the protruding socket, and means for positioning the top shell at a predetermined height above the PCB of the host device to allow coupling of the top shell to a heatsink of the host device.

In another example embodiment, a pluggable ONU transceiver module comprises a top shell, a bottom shell configured to mate with the top shell to form a cavity and further configured to position the top shell at a predetermined height above a PCB of a host device, and a PCB disposed within the cavity. A plurality of I/O pins are coupled to the PCB disposed within the cavity and are configured to be inserted into a protruding socket of the host device through the bottom shell. The protruding socket is mounted on the PCB of the host device. The pluggable ONU transceiver module further comprises an opening formed in the bottom shell and configured to ensure that the I/O pins are inserted correctly into the protruding socket.

In yet another example embodiment, a pluggable ONU transceiver module comprises a top shell, a bottom shell configured to mate with the top shell to form a cavity, and a PCB disposed within the cavity. A plurality of I/O pins are coupled to the PCB and are configured to be inserted into a protruding socket of a host device through the bottom shell. The protruding socket is mounted on a PCB of the host device. The pluggable ONU transceiver module further comprises two guiding tabs formed in the bottom shell and configured to ensure that the I/O pins are inserted correctly into corresponding holes in the protruding socket, and means for positioning the top shell at a predetermined height above the PCB of the host device to allow coupling of the top shell to a heatsink of the host device.

Additional features of the invention will be set forth in the description which follows, and in part will be obvious from the description, or may be learned by the practice of the invention. The features of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIGS. 3A-3D disclose an example of a pluggable ONU transceiver module according to embodiments of the invention.

DETAILED DESCRIPTION OF THE PREFERRED EMBODIMENTS

Reference will now be made to the figures wherein like structures will be provided with like reference designations. It is understood that the figures are diagrammatic and schematic representations of example embodiments of the invention, and are not limiting of the present invention, nor are they necessarily drawn to scale.

FIGS. 2-4C disclose various aspects of some example embodiments. Embodiments of the ONU transceiver module may, among other things, ensure proper insertion of the ONU transceiver module I/O pins into a corresponding host device's protruding connector, prevent tilting of the ONU transceiver module when plugged into the host device, and/or position the top of the ONU transceiver module at a predetermined height to mate with a heatsink fastened to the host device. Note that the principles disclosed herein can also be applied to other pluggable communication modules where I/O pin alignment, tilt prevention, and/or module height positioning are desired.

I. General Aspects of Some ONU Transceiver Modules

Figure 1A:
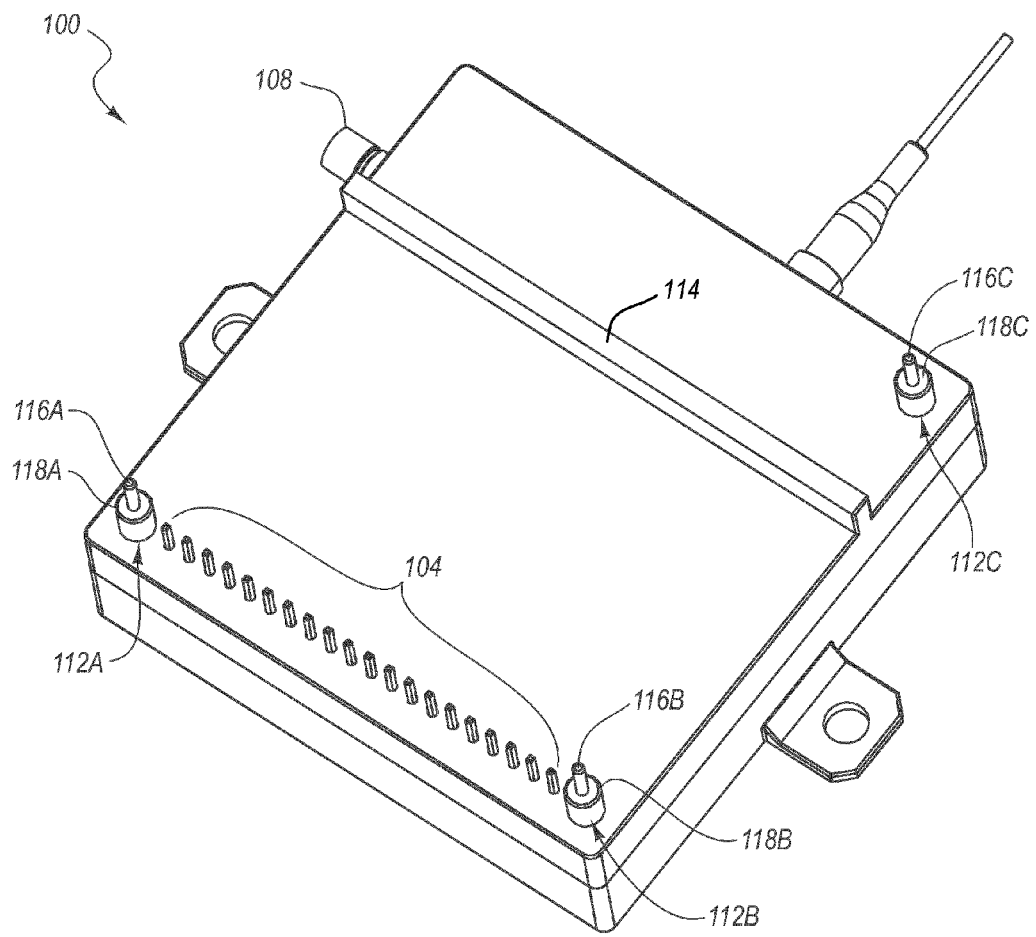
FIGS. 1A and 1B illustrate a conventional pluggable ONU transceiver module and host device having a protruding I/O socket, respectively.
Figure 1B:
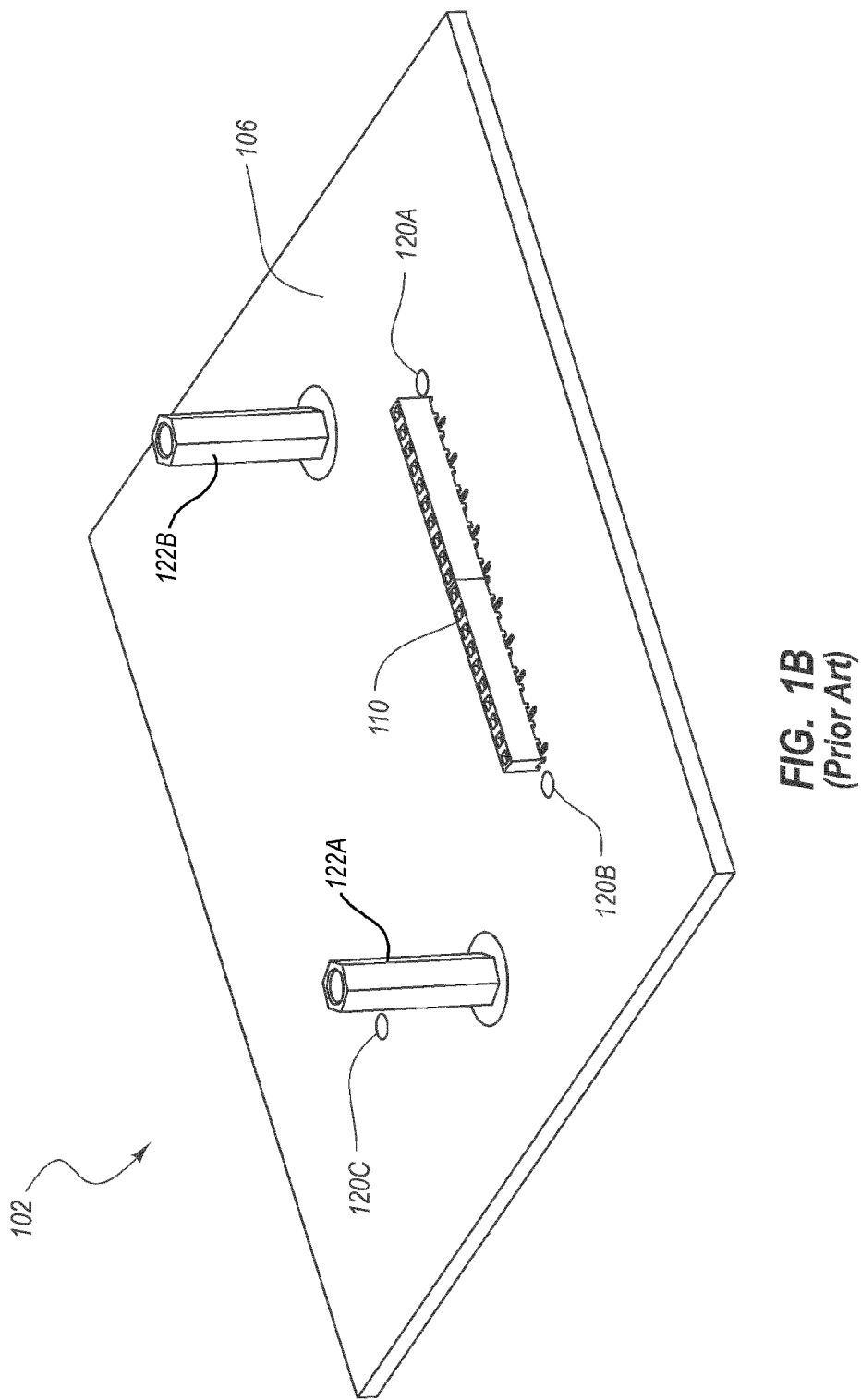
Figure 2:
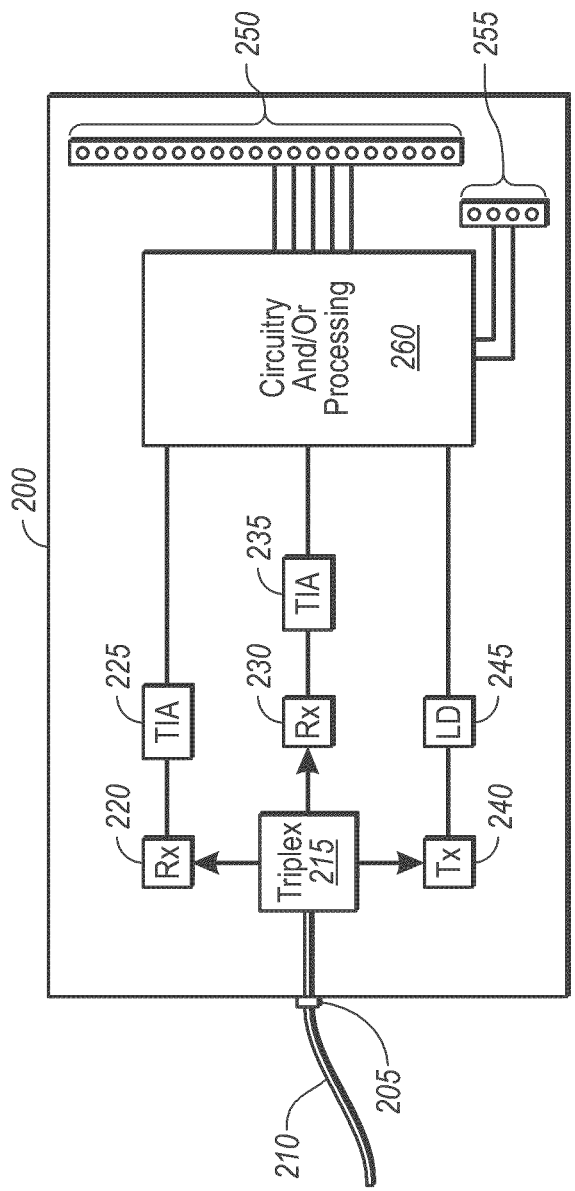
FIG. 2 discloses some of the components that may be found in a pluggable ONU transceiver module according to embodiments of the invention.

FIG. 2 illustrates some of the components that may be found in an exemplary pluggable ONU transceiver module 200. The example pluggable ONU transceiver module 200 can include an optical connector 205 configured to connect to an optical network via a single optical fiber 210 for both upstream and downstream optical communication over the single fiber 210. The single fiber 210 can be a single mode fiber, such as an SMF-28E fiber. The single fiber 210 can also include a fiber pigtail connecting the pluggable ONU transceiver module 200 to the network via another fiber optical connection at another end of the fiber pigtail.

The pluggable ONU transceiver module 200 includes an optical triplexer 215 for separating received optical signals from the optical network and for transmitting a transmit optical signal to the optical fiber. For example, the pluggable ONU transceiver module 200 can include a triplexer including collimating ball lenses as disclosed in U.S. patent application Ser. No. 12/031,234, filed Feb. 14, 2008, the contents of which are hereby incorporated by reference herein.

The example pluggable ONU transceiver module 200 further includes a first receive line including a first optical receiver 220, such as a first photodiode. The first receive line further includes a first TIA 225 for amplifying an electrical data signal generated by the first optical receiver 220 from a received optical data signal. The pluggable ONU transceiver module 200 further includes a second receive line including second optical receiver 230, such as a second photodiode. The second receive line further includes a second TIA 235 for amplifying an electrical video signal generated by the second optical receiver 230. Examples of optical receivers that may be used for the first and/or second optical receivers 220, 230 include photodiodes, avalanche photodetectors, metal-semiconductor-metal detectors, and the like.

The pluggable ONU transceiver module 200 further includes a transmit line including a laser 240 for generating an optical data signal from an electrical data signal received from a laser driver 245. Examples of lasers that can be used for the laser 240 include edge emitting lasers such as double heterostructure, quantum well, strained layer, distributed feedback, and distributed Bragg reflector lasers, as well as vertical cavity surface-emitting lasers (VCSELs), and the like.

Thus, the example pluggable ONU transceiver module is configured to transmit and receive digital data signals over the first receive line and the transmit line. The ONU transceiver module is also configured to receive analog video signals over the second receive line.

The pluggable ONU transceiver module further includes I/O and video interfaces including I/O contacts 250 and video contacts 255, respectively. The I/O and video contacts 250 and 255 are electrically coupled directly, or indirectly via additional circuitry and/or a processor 260, to the laser driver 245, first post amplifier 225 and the second post amplifier 235. The I/O contacts 250 can include a single linear array of electrical contacts, while the video contacts 255 can be part of an SMB or other RF connector.

The laser 240, first optical receiver 220, and second optical receiver 230 each have a different associated wavelength so that the signals received and transmitted thereby may be triplexed. The wavelength associated with the laser 240, first optical receiver 220 and second optical receiver 230 can be any wavelength between 375 nanometers and 1800 nanometers in some embodiments. For example, the wavelengths associated with the laser 240, first optical receiver 220, and second optical receiver 230 can be about 1310 nanometers, about 1490 nanometers, and about 1550 nanometers. The laser 240 can be associated with a signal wavelength of about 1310 nanometers, the first optical receiver 220 receiving digital data signals can be associated with a signal wavelength of about 1490 nanometers, and the second optical receiver 230 receiving analog video signals can be associated with a signal wavelength of about 1550 nanometers. For example, about 1310 nanometers can refer to wavelengths between 1290 and 1330 nanometers, about 1490 nanometers can refer to wavelengths between 1480 and 1500 nanometers, and about 1550 nanometers can refer to wavelengths between 1540 and 1560 nanometers.

The video signal can be a CATV video signal which ranges between 55 megahertz and 870 megahertz. The optical video signal can be an internet protocol television (IPTV) signal. The digital data signals can transmit digital data at rates between 1 and 10 Gbp/s or more. For example, the second optical receiver 230 can receive data transmitted at rates of about 2.5 Gbp/s and the laser 240 can transmit digital data at rates of about 1.25 Gbp/s.

II. Aspects of Some Example Embodiments

Figure 3A:
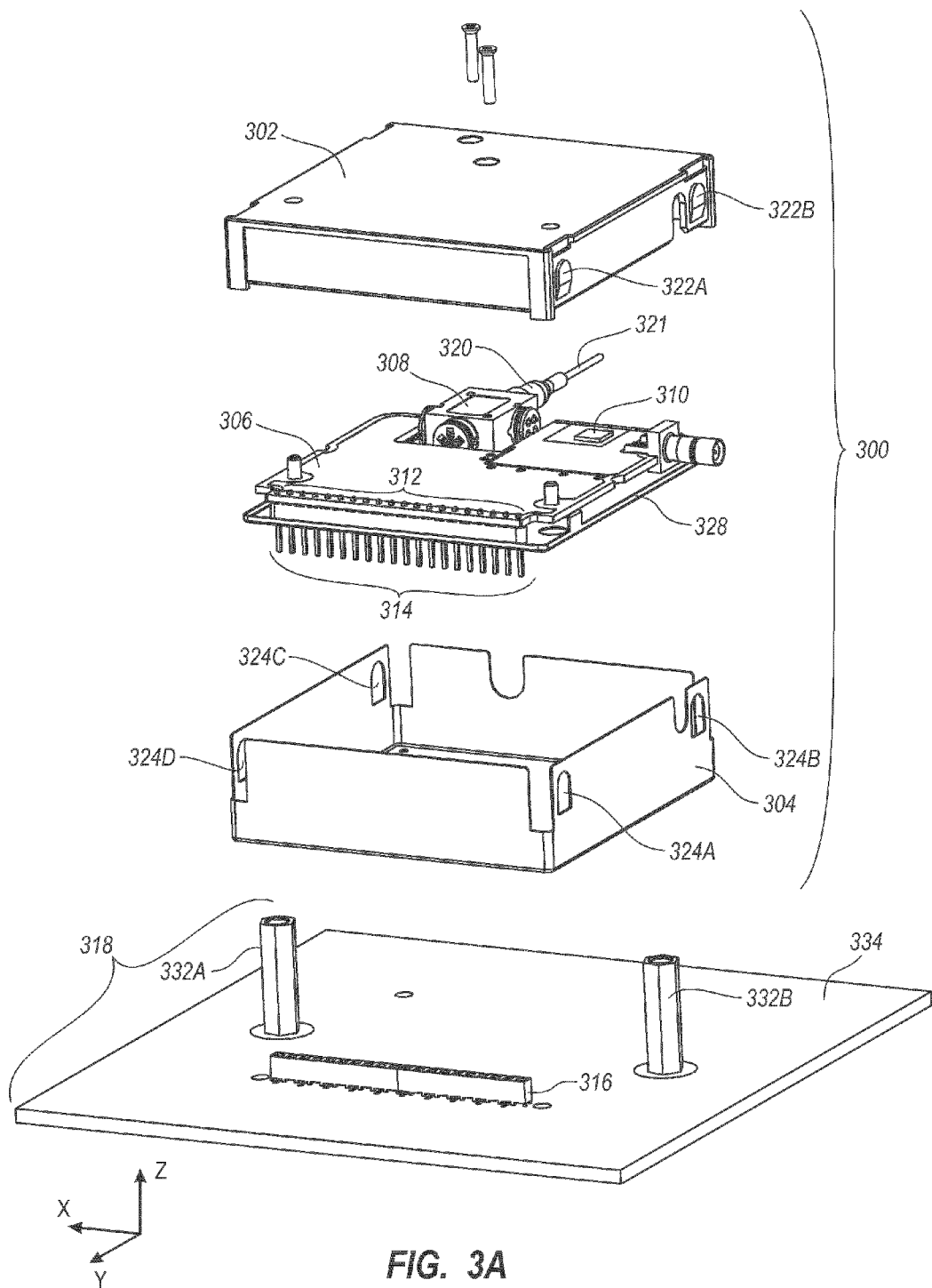
Figure 3B:
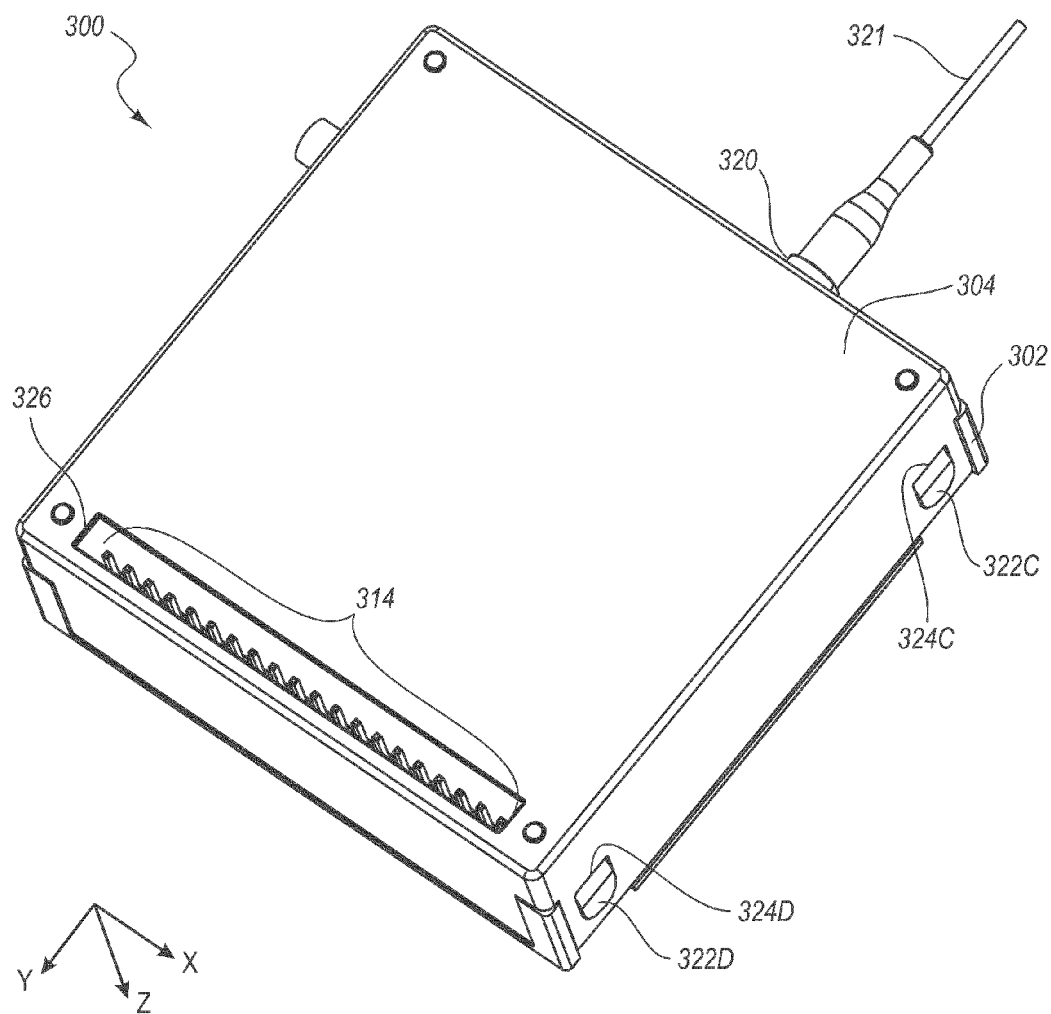
Figure 3C:
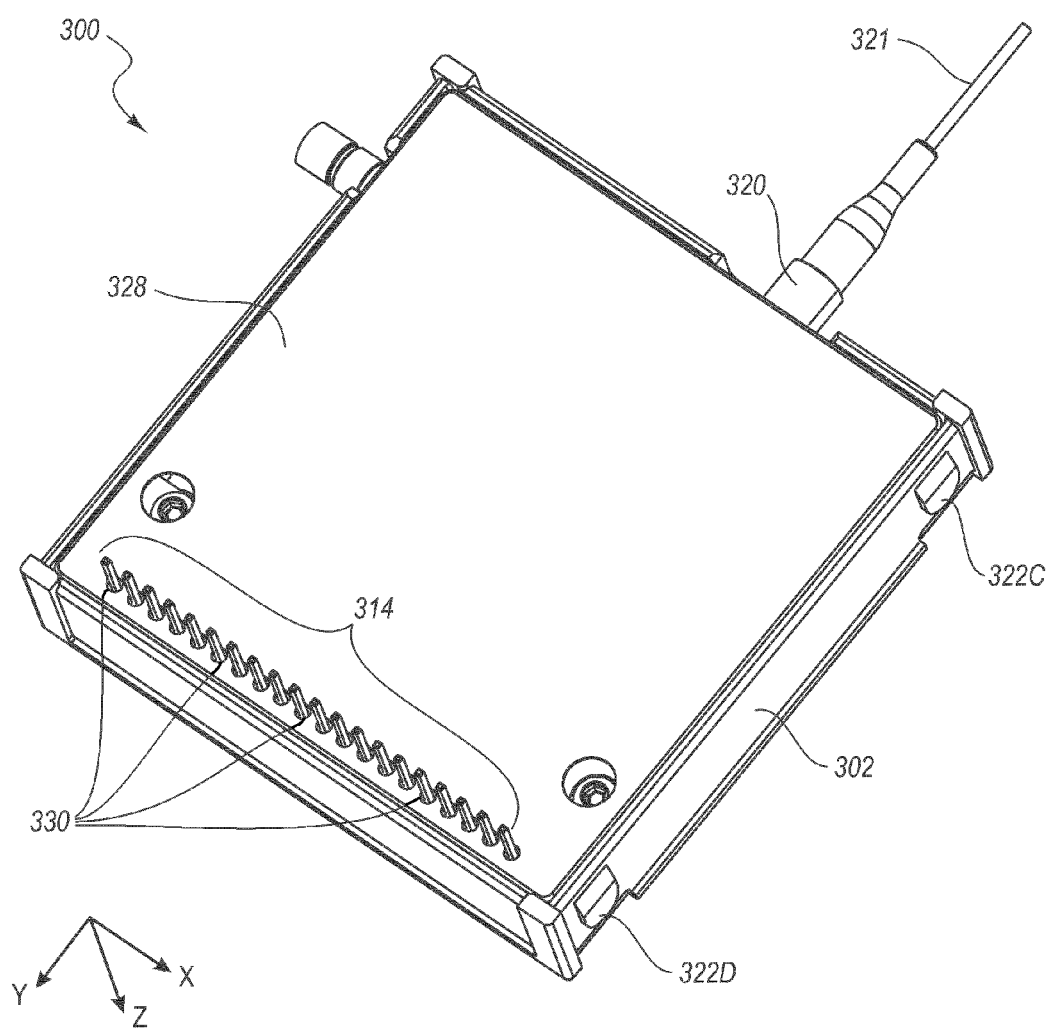

Referring now to FIGS. 3A-3D, an example of a pluggable ONU transceiver module 300 is illustrated according to some embodiments of the invention. FIG. 3A illustrates an exploded perspective view, FIGS. 3B and 3C illustrate upside-down perspective views, and FIG. 3D illustrates a side view of the ONU transceiver module 300.

The ONU transceiver module 300 includes a top shell 302 and a bottom shell 304 configured to mate together to form a cavity. As best seen in FIG. 3A, a PCB 306 is disposed within the cavity, upon which are mounted a triplexer 308 and circuitry 310 that may include a processor or the like. The PCB 306 further includes a plurality of I/O contacts 312. A plurality of I/O pins 314 are coupled to the PCB 306 via the I/O contacts 312 and are configured to be inserted into a protruding socket 316 on a corresponding host device 318 and to electrically connect the ONU transceiver module 300 to the host device 318. The ONU transceiver module 300 further includes an optical connector 320 configured to connect to an optical fiber 321 to access an optical network.

In some embodiments, the top shell 302 and bottom shell 304 can be secured together using any of a variety of means. In the embodiment of FIGS. 3A-3D, for example, the top shell 302 includes a plurality of protrusions 322A-322D configured to engage complementary openings 324A-324D formed in the bottom shell 304. Alternately or additionally, the top shell 302 can be coupled to the bottom shell 304 using one or more screws, bolts, pins, or other fasteners or the like.

As shown in FIG. 3B, a guiding feature 326 is integrated with the bottom shell 304 and is configured to ensure that the plurality of I/O pins 314 are inserted into the correct holes of the protruding socket 316. In particular, the guiding feature 326 comprises a rectangular opening in the bottom shell 304 that is sized to receive the protruding socket 316. For instance, the length of the rectangular opening guiding feature 326 can be substantially equal to the length of the protruding socket 316. According to this embodiment, the I/O pins 314 are positioned within the cavity formed by the top shell 302 and bottom shell 304 such that when the rectangular opening guiding feature 326 is aligned with the protruding socket 316, each of the I/O pins 314 is automatically aligned with the correct hole of the protruding socket 316. Because the length of the rectangular opening guiding feature 326 is substantially equal to the length of the protruding socket 316, the I/O pins 314 are substantially constrained to insert into the correct holes of the protruding socket 316 when the protruding socket 316 is inserted into the rectangular opening guiding feature 326.

The rectangular opening guiding feature 326 allows the protruding socket 316 to be received into the cavity formed by the top shell 302 and bottom shell 304. In some embodiments, this allows the flat bottom of the bottom shell 304 to rest directly on a PCB 334 of the host device 318. As such, the bottom shell 304 is configured to prevent the ONU transceiver module 300 from tilting when plugged into the host device 318.

Although the guiding feature 326 is disclosed in FIG. 3B as a rectangular opening that is complementary to the shape of the protruding socket 316, the guiding feature 326 can alternately comprise an opening having a circular, oval, or other shape depending on the shape of the protruding socket 316.

With combined reference to FIGS. 3A and 3C, in some embodiments of the invention an electromagnetic interference (EMI) shield 328 is positioned between the PCB 306 and bottom shell 304 to substantially prevent the entrance or exit of electromagnetic radiation (EMR) into or out of the ONU transceiver module 300. As can be seen in FIG. 3C, which shows the ONU transceiver module 300 without bottom shell 304, the EMI shield 328 includes individual openings 330 through which each of the I/O pins 314 extends from the PCB 306 downwards (e.g., towards the bottom shell 304). Thus, although EMR in some embodiments may pass into our out of the ONU transceiver module 300 through the rectangular opening guiding feature 322 of the bottom shell 304, the EMI shield 328 is configured to substantially prevent EMR from passing through the EMI shield 328, which EMR might otherwise adversely affect the PCB 306 and electronic/optoelectronic components mounted thereto in the case of externally generated EMR, or that might adversely affect the host device 318 or other devices external to the ONU transceiver module 300 in the case of internally generated EMR. In other embodiments, the EMI shield 328 can be omitted.

With combined reference now to FIGS. 3A and 3D, additional details according to embodiments of the invention are disclosed. As shown, the host device 318 includes a plurality of posts 332A and 332B mounted on the PCB 334 of the host device 318. Each of the posts 332A and 332B includes a threaded through hole configured to receive a screw, bolt or other fastener to secure a heatsink (not shown) to the posts 332A and 332B. The heatsink is configured to contact the top of the module 300 to dissipate heat away from the module 300. To facilitate heat dissipation, the top of the ONU transceiver module 300 is configured to be positioned at a predetermined height $H_1$ above the PCB 334 of host device 318 when the ONU transceiver module 300 is plugged into the host device 318. As shown in FIG. 3D, the predetermined height $H_1$ extends slightly above the top of the posts 332A, 332B.

In the embodiment of FIGS. 3A-3D, the top of the ONU transceiver module 300, e.g., the top of top shell 302, is positioned at the predetermined height $H_1$ above the PCB 334 of host device 318 by bottom shell 304. The bottom shell 304 can be formed from stamped sheet metal or the like and can be manufactured in a variety of sizes to accommodate a variety of predetermined heights $H_1$. The size of the bottom shell 304 can be varied by selecting a desired value for lower height $H_2$ (FIG. 3D) of the bottom shell 304, without changing any of the other dimensions of the bottom shell 304. For example, to position the top of the ONU transceiver module 300 at a relatively high predetermined height $H_1$, the bottom shell 304 will have a relatively large lower height $H_2$. In contrast, to position the top of the ONU transceiver module 300 at a relatively low predetermined height $H_1$, the bottom shell 304 will have a relatively small lower height $H_2$. Accordingly, the bottom shell 304 serves as one example of a structural implementation of a means for positioning the top of an ONU transceiver module at a predetermined height $H_1$ above the PCB 334 of host device 318.

In some embodiments, then, the bottom shell 304 provides an integrated solution for (1) ensuring that I/O pins are inserted correctly into the protruding socket of the host device, (2) preventing tilting of pluggable ONU transceiver modules when plugged into host devices with protruding sockets, and (3) positioning the top of the ONU transceiver module at a predetermined height to contact a heatsink. In contrast to conventional solutions for these problems, the bottom shell 304 is an integrated solution comprising a single component that can be assembled to the rest of the ONU transceiver module 300 in a single step. In comparison, prior art solutions include multiple components that are assembled to the rest of the module in multiple steps. Moreover, the bottom shell 304 presents a robust design that is less susceptible to breaking than conventional stepped guiding pins and bottom shells with holes to receive the stepped guiding pins.

Figure 4A:
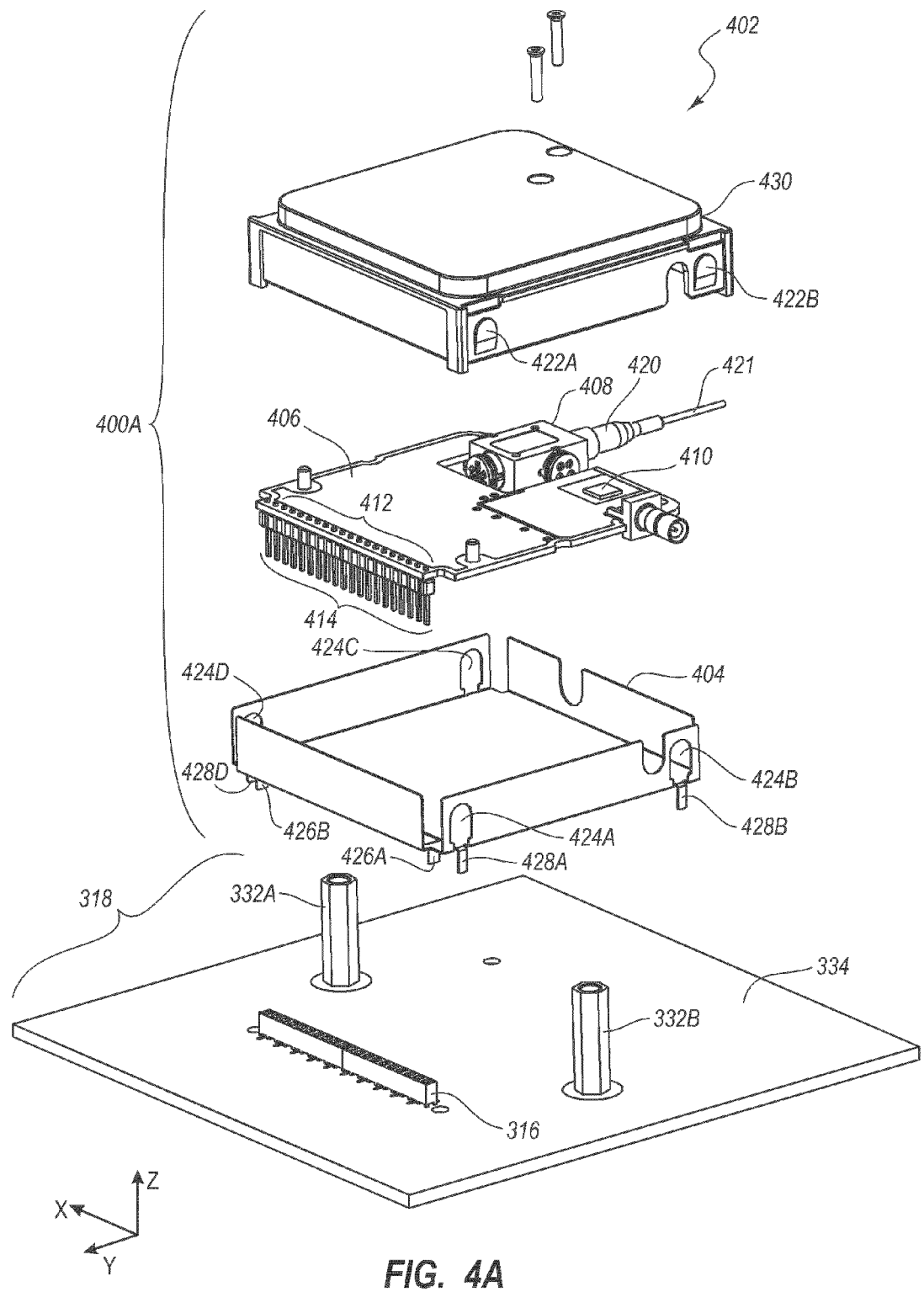
FIGS. 4A-4C disclose two more examples of pluggable ONU transceiver modules according to embodiments of the invention.
Figure 4B:
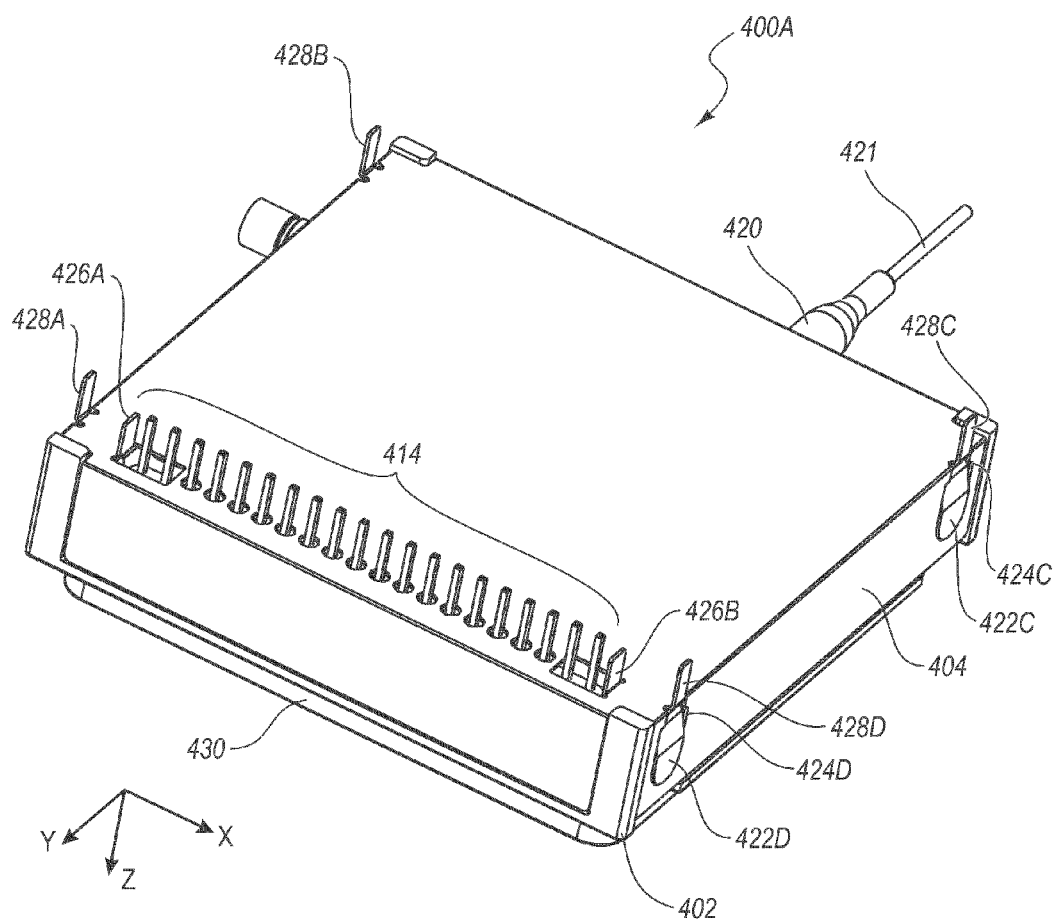
Figure 4C:
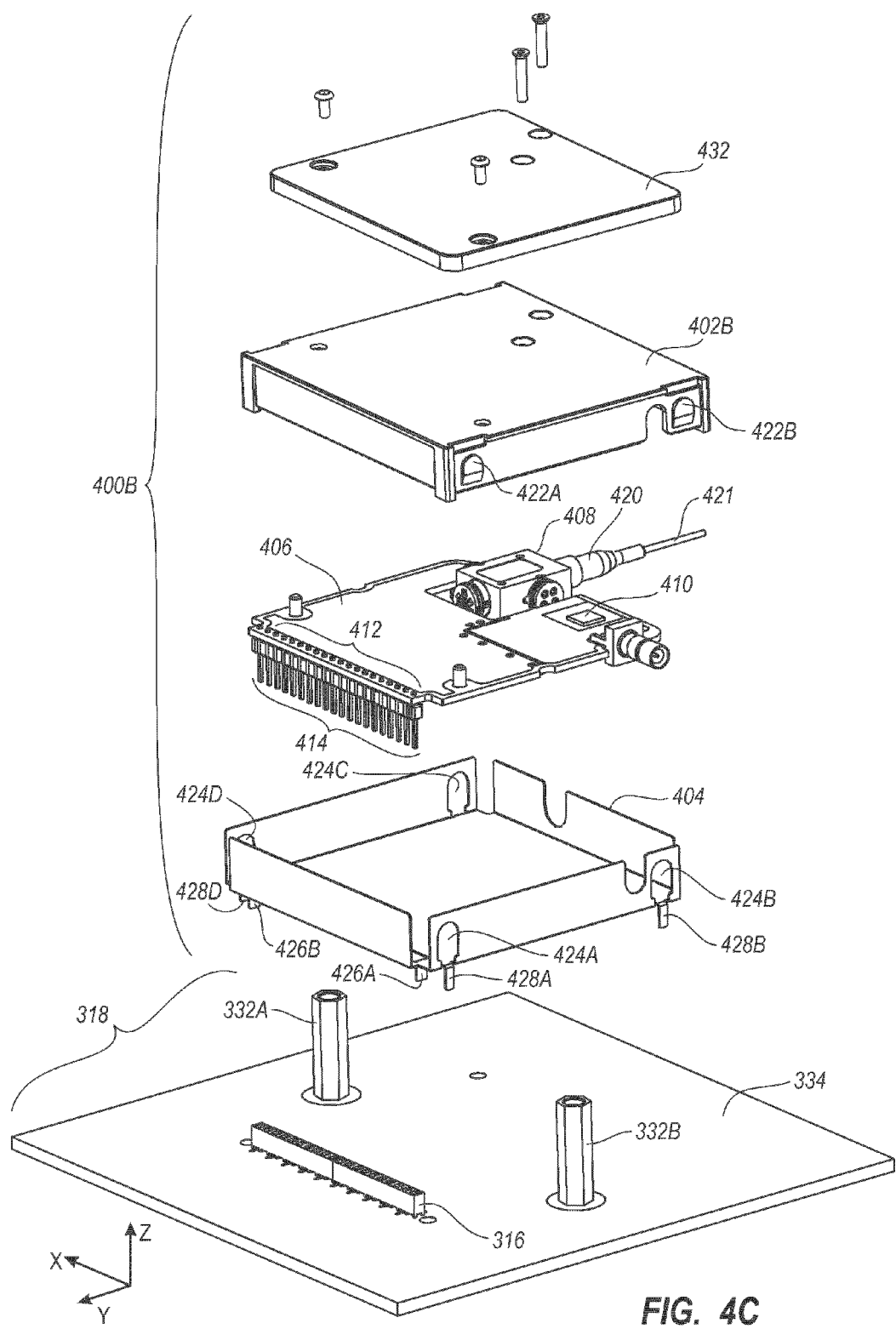

While FIGS. 3A-3D disclose an integrated solution for the problems described above, embodiments of the invention are not limited to integrated solutions. For instance, FIGS. 4A-4C disclose two other example ONU transceiver modules according to embodiments of the invention. More specifically, FIG. 4A illustrates an exploded perspective view and FIG. 4B illustrates an upside-down perspective view of a second example ONU transceiver module 400A; FIG. 4C illustrates an exploded perspective view of a third example ONU transceiver module 400B.

The ONU transceiver module 400A of FIGS. 4A and 4B includes a top shell 402 and bottom shell 404 configured to mate together to form a cavity. As best seen in FIG. 4A, a PCB 406 is disposed inside the cavity, upon which are mounted a triplexer 408 and circuitry 410. The PCB 406 further includes a plurality of I/O contacts 412. A plurality of I/O pins 414 are coupled to the PCB 406 via the I/O contacts 412 and are configured to be inserted into the protruding socket 316 of host device 318 and to electrically connect the ONU transceiver module 400A to the host device 318. The ONU transceiver module 400A additionally includes an optical connector 420 configured to connect to an optical fiber 421 to access an optical network.

Top shell 402 includes a plurality of protrusions 422A-422D configured to engage complementary openings 424A-424D formed in the bottom shell 404, to thereby secure the top shell 402 to the bottom shell 404. Alternately or additionally, top shell 402 can be coupled to bottom shell 404 using one or more screws, bolts, pins, or other fasteners or the like.

As best seen in FIG. 4B, a plurality of guiding features 426A, 426B are integrally formed in the bottom shell 404 and are configured to ensure that the plurality of I/O pins 414 are inserted into the correct holes of the protruding socket 316. In particular, the guiding features 426A, 426B comprise tabs formed by cutting and bending the tabs outwards from the bottom shell 404. The distance between the tabbed guiding features 426A, 426B can be substantially equal to the length of the protruding socket 316. According to this embodiment, the I/O pins 414 are positioned between the tabbed guiding features 426A, 426B such that when the protruding socket 316 is aligned between the tabbed guiding features 426A, 426B, each of the I/O pins 414 is automatically aligned with the correct hole of the protruding socket 316. Because the distance between the tabbed guiding features 426A, 426B is substantially equal to the length of the protruding socket 316, the I/O pins 414 are inserted into the correct holes of the protruding socket 316 when the protruding socket 316 is aligned between the tabbed guiding features 426A, 426B.

To prevent the ONU transceiver module 400A from tilting when plugged into the host device 318, the ONU transceiver module 400A includes a plurality of tabbed feet 428A-428D integrated into the bottom shell 404. The tabbed feet 428A-428D are formed in some embodiments during the formation of openings 424A-424D, as will be understood by those skilled in the art in view of the present disclosure.

In the embodiment of FIGS. 4A-4B, the top of the ONU transceiver module 400A, e.g., the top of top shell 402, is positioned at a predetermined height above the PCB 334 of host device 318 by top shell 402 to allow proper mating of a heatsink (not shown) secured to posts 332A, 332B with the ONU transceiver module 400A. In particular, top shell 402 can be manufactured in a variety of sizes to accommodate a variety of predetermined heights. The size of the top shell 402 can be varied by selecting a desired thickness for an extension 430 of the top shell 402, without changing any of the other dimensions of the top shell 402. For example, to position the top of the ONU transceiver module 400A at a relatively high predetermined height, the top shell 402 will have a relatively thick extension 430. In contrast, to position the top of the ONU transceiver module 400A at a relatively low predetermined height, the top shell 402 will have a relatively thin extension 430. Accordingly, the top shell 402 serves as a second example of a structural implementation of a means for positioning the top of an ONU transceiver module at a predetermined height above the PCB 334 of host device 318.

Turning to FIG. 4C, ONU transceiver module 400B is similar in some respects to ONU transceiver module 400A of FIGS. 4A and 4B. In particular, the ONU transceiver module 400B can include the same bottom shell 404, PCB 406, triplexer 408, circuitry 410, contacts 412, I/O pins 414, optical connector 420, protrusions 422A-422D, openings 424A-424D, guiding features 426A, 426B, and tabbed feet 428A-428D as the ONU transceiver module 400A of FIGS. 4A and 4B. Further, the guiding features 426A, 426B and tabbed feet 428A-428D of FIG. 4C ensure that the I/O pins 414 are inserted correctly into the protruding socket 316 and prevent the ONU transceiver module 400B from tilting when plugged into the host device 318 in the same way as the guiding features 426A, 426B and tabbed feet 428A-428D of FIGS. 4A and 4B.

In contrast, however, the ONU transceiver module 400B includes a top shell 402B that is different than the top shell 402 of FIGS. 4A and 4B. Specifically, the top shell 402B of FIG. 4C lacks the extension 430 of FIGS. 4A and 4B. Instead, the ONU transceiver module 400B of FIG. 4C includes a separate insert 432 configured to position the top of the ONU transceiver module 400B at a predetermined height above the PCB 334 of host device 318 to allow proper mating of a heatsink (not shown) secured to posts 332A, 332B with the ONU transceiver module 400B. The insert 432 can be manufactured in a variety of thicknesses to accommodate a variety of predetermined heights $H_1$ and can be secured to the top shell 402B. To position the top of the ONU transceiver module 400B at a relatively high predetermined height, the insert 432 will be relatively thick. In contrast, to position the top of the ONU transceiver module 400B at a relatively low predetermined height, the insert 432 will be relatively thin. Accordingly, the insert 432 serves as a third example of a structural implementation of a means for positioning the top of an ONU transceiver module at a predetermined height above the PCB 334 of host device 318.

Accordingly, the ONU transceiver modules 400A and 400B include a bottom shell 404 configured to (1) ensure that I/O pins are inserted correctly into the protruding socket of the host device via guiding features 426A, 426B and (2) prevent tilting of pluggable ONU transceiver modules when plugged into host devices with protruding sockets via tabbed feet 428A-428D. Further, the ONU transceiver modules 400A and 400B include means for (3) positioning the top of the ONU transceiver module 400A or 400B at a predetermined height to contact a heatsink.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A pluggable optical network unit transceiver module comprising:
   a top shell;
   a bottom shell configured to mate with the top shell to form a cavity;
   a printed circuit board disposed within the cavity;
   a plurality of I/O pins coupled to the printed circuit board and configured to be inserted into a socket mounted on a printed circuit board of a host device, with the printed circuit board of the host device positioned external to the cavity, in a manner such that a top surface of the module is positioned at a predetermined height above the printed circuit board of the host device; and
   a guiding feature formed in the bottom shell and configured to guide the plurality of I/O pins during insertion into the socket.

2. The module of claim 1, wherein the bottom shell includes a plurality of feet configured to be positioned on the printed circuit board of the host device to prevent the module from tipping when the plurality of I/O pins are received within the socket.

3. The module of claim 1, wherein the guiding feature includes an opening formed in the bottom shell that is shaped to be substantially equal to the shape of the socket in order to receive the socket in a manner such that each of the plurality of I/O pins is aligned with and operatively coupled to a corresponding hole of the socket when the socket is aligned with and inserted into the opening.

4. The module of claim 1, wherein the top shell includes a plurality of protrusions configured to engage a plurality of complementary openings formed in the bottom shell to secure the top shell and bottom shell together.

5. The module of claim 1, further comprising an electromagnetic interference shield disposed in the cavity between the printed circuit board of the module and the bottom shell and configured to substantially prevent electromagnetic radiation generated by the module from exiting the module.

6. The module of claim 5, wherein the electromagnetic interference shield includes individual holes through which the plurality of I/O pins pass.

7. The module of claim 1, further comprising: wherein the guiding feature includes two guiding tabs formed in the bottom shell and configured to guide the plurality of I/O pins into corresponding holes in the socket.

8. The module of claim 7, wherein a distance between the two guiding tabs is substantially equal to the length of the socket such that the socket is capable of being received between the guiding tabs thereby aligning each of the plurality of I/O pins with the corresponding hole of the socket.

9. The module of claim 1, further comprising an insert positioned on the top shell and including the top surface of the module and having a thickness configured to maintain the top surface of the module positioned at the predetermined height.

10. The module of claim 2, wherein the bottom shell is stamped from a single piece of sheet metal and the plurality of feet are integrally formed in the bottom shell.

11. The module of claim 3, wherein the shape of the opening formed in the bottom shell and the shape of the socket are rectangular, circular, or oval.

12. The module of claim 8, wherein the bottom shell is stamped from a single piece of sheet metal and the two guiding tabs are integrally formed in the bottom shell.

13. The module of claim 1, wherein the bottom shell includes a substantially flat surface configured to be positioned on the printed circuit board of the host device to prevent the module from tipping when the plurality of I/O pins are received within the socket.

14. The module of claim 1, wherein the top shell includes the top surface of the module and one or more structures formed in the top shell are configured to rest on top of one or more corresponding structures formed in the bottom shell such that a height of the one or more corresponding structures formed in the bottom shell is configured to maintain the top surface of the module positioned at the predetermined height.

15. The module of claim 14, wherein the one or more structures formed in the top shell include four structures positioned at four corners of the top shell, respectively, and the one or more corresponding structures formed in the bottom shell included four corresponding structures positioned at four corners of the bottom shell, respectively.

16. The module of claim 15, wherein the bottom shell is stamped from a single piece of sheet metal and the four corresponding structures positioned at four corners of the bottom shell are integrally formed in the bottom shell.

17. The module of claim 1, wherein the top shell includes an extension that includes the top surface of the module and that has a thickness configured to maintain the top surface of the module positioned at the predetermined height.

18. The module of claim 17, wherein the extension is fastened to the top shell.

19. The module of claim 1, wherein the printed circuit board disposed within the cavity includes a triplexer mounted thereon.

20. The module of claim 19, further comprising an optical connector coupled to the triplexer and configured to connect to an optical fiber to access an optical network.

* * * * *

UNITED STATES PATENT AND TRADEMARK OFFICE
CERTIFICATE OF CORRECTION

| | | |
|---|---|---|
| PATENT NO. | : 8,573,860 B2 | Page 1 of 1 |
| APPLICATION NO. | : 13/652381 | |
| DATED | : November 5, 2013 | |
| INVENTOR(S) | : Teo | |

It is certified that error appears in the above-identified patent and that said Letters Patent is hereby corrected as shown below:

In the Claims

In Column 10, Line 6, in Claim 7, delete "1, further comprising:" and insert -- 1, --, therefor.

Signed and Sealed this
Eleventh Day of March, 2014

Michelle K. Lee
*Deputy Director of the United States Patent and Trademark Office*